Dec. 7, 1954 W. E. BRADLEY 2,696,520

COLOR TELEVISION CAMERA SYSTEM

Filed Jan. 19, 1951 2 Sheets-Sheet 1

INVENTOR.
WILLIAM E. BRADLEY
BY
Allen V. Hazeltine
ATTORNEY

Dec. 7, 1954 W. E. BRADLEY 2,696,520

COLOR TELEVISION CAMERA SYSTEM

Filed Jan. 19, 1951

2 Sheets-Sheet 2

INVENTOR.
WILLIAM E. BRADLEY
BY
Allen V. Hazeltine
ATTORNEY

United States Patent Office 2,696,520

Patented Dec. 7, 1954

2,696,520

COLOR TELEVISION CAMERA SYSTEM

William E. Bradley, New Hope, Pa., assignor to Philco Corporation, Philadelphia, Pa., a corporation of Pennsylvania Application January 19, 1951, Serial No. 206,769

15 Claims. (Cl. 178—5.4)

The present invention relates to electrical systems and more particularly to camera systems for producing color television image signals.

Camera systems for producing color television image signals are known in which the optical image to be transmitted is resolved into three primary color components by means of suitable color filter elements and each of the components is thereafter analyzed to produce three component signals. Such color filters, which may take the form, for example, of dichroic mirrors, or of colored sheets of glass, gelatine or the like, selectively transmit or reflect one of each of the primary color components of the image onto a suitable photoelectrically sensitive element which in turn produces the desired color component signals.

The use of color filters of the aforementioned type has the disadvantage that inevitably variations occur in the color transmission properties of the color filters which accordingly bring about changes in the values and/or the balance of the resulting color component signals. More particularly, due to production variations, there occur minor but significant differences in the color characteristics of the filters used in different cameras of a given type so that, when televising a given object or scene, variations in the color signals occur when switching from one camera to another. Furthermore, the color filters age in an unpredictable manner so that the balance of the color componet signals of a given camera changes with time.

In the copending application of W. P. Boothroyd and E. M. Creamer, Jr., Serial No. 203,248, filed December 29, 1950, and assigned to the same assignee as the present application, there is described and claimed a so-called "dot-sequential" system for color television utilizing a single camera tube for producing the desired color signals. In the said system the image to be transmitted is superimposed on a screen constituted by a plurality of elongated parallel arranged groups of stripes of color filter material each stripe of each group being adapted to transmit light of a given primary color. Each of the groups of stripes may be termed a color triplet and the sequence of the stripes is repeated in consecutive order over the area of the screen. Each group of stripes or triplet has a width dimension of the order of magnitude of one picture element so that in effect each picture element of the visual image to be transmitted is analyzed into its three primary color components. The color image so resolved by the screen is transferred to the photosensitive cathode of the camera tube which, by suitable deflection of the cathode ray beam thereof in a direction transverse to the direction of the stripes, produces an output signal comprising, in consecutive order, variations proportional to the primary color contents of the picture elements. By suitably spacing the color triplets there may be formed adjacent to each triplet an element corresponding to an absence of color and the signal produced by the cathode ray beam when such an element is provided, may be used as an indexing signal to insure accurate color sampling of the output voltage of the camera into three distinct voltages, each varying proportionally to variations of a given primary color component of the consecutive picture elements.

It is an object of the invention to provide an improved image signal generating system for color television utilizing a single camera tube to produce signals corresponding to the primary color components of the image to be transmitted.

Another object of the invention is to provide an improved image signal generating system utilizing a single camera tube and wherein the picture elements of the image to be transmitted are resolved into a plurality of consecutively occurring triplets of their primary color components.

A further object of the invention is to provide a single tube camera system for producing color television image signals, which system has a high degree of light efficiency and sensitivity.

Another object of the invention is to provide a camera system for color television, which system embodies color component determining elements which may be readily duplicated as to their color characteristics and which undergo no change in characteristics with time.

A further object of the invention is to provide a camera system for color television in which system a well defined indexing signal for analyzing the primary color components of the image is produced in a positive manner.

These and further objects of the invention will appear as the specification progresses.

In accordance with the invention, these objects are achieved by means of a camera system utilizing a single camera tube in which the image to be transmitted is divided into a plurality of line elements. The line elements so produced, each having a width of the order of magnitude of a picture element, are projected onto the photosensitive cathode of the camera tube through the intermediary of a light refracting element which disperses each of the line elements into a spectrum band. By suitably analyzing the color spectra projected on the photosensitive cathode a signal voltage is produced having variations corresponding to the intensity of the color components of the spectra of the line elements. In the dot-sequential scanning system hereinafter referred to in detail the electron beam is deflected transverse to the spectrum bands and the signal voltage so produced is in turn sampled at a rate determined by the geometry of the system to produce color signal components indicative of the primary color components of the image to be transmitted.

More specifically, and in accordance with one embodiment of the color television system of the invention as herein described, the image to be transmitted is focused by a suitable lens system in the plane of a collimating line grating consisting essentially of an opaque plane member provided with light transmitting narrow slits having a width of the order of one-fourth or less of the distance between slits and the number of which is at least as great as the number of picture elements to be contained in one horizontal line of the television picture. The multiple line image so formed by the collimating line grating is in turn projected by a lens system onto the photosensitive cathode of a camera tube producing thereon an electron charge distribution corresponding to the light distribution of the projected image which is then scanned either directly or indirectly in accordance with well known principles. A color dispersion prism is interposed between the collimating line grating and the photo cathode of the camera tube and, due to the action of the prism, each line of light formed by the slits of the grating is spread out onto a spectrum so that each slit is the source of one spectrum or color group. As the electron image produced by the photosensitive cathode is transversely scanned, for example by means of a cathode ray beam, as takes place in a so-called image orthicon type of camera tube, the beam encounters first the red, then the green and then the blue color components of the consecutive light lines from the slits and the signal voltage produced will have variations proportional to variations in the intensity of the red, green and blue components of the light lines. The dispersion of the light lines by the prism is so effected that the consecutively arranged spectra formed on the photocathode are separated by a determinable amount, conveniently of the order of one-third to one-fourth of the width of one complete color group, whereby, during a line scan by the beam, there is produced a signal of predetermined value which may be used as an indexing signal for accurately analyzing the signal voltage from the camera tube into its primary color components.

Preferably and in order to facilitate the sampling of the signal voltage into its primary color components, each of the spectra derived from the line elements is made to exhibit a linear distribution of the three primary color components, i. e. the red, green and blue components of each spectrum are uniformly spaced relative to each other.

In accordance with the preferred embodiment of the invention the collimating line grating consists of a multiplicity of contiguous cylindrical lenses having a width of the order of a picture element. These cylindrical lenses diffract the light normally impinging on the opaque portions of the collimating line grating above described so that line elements of high intensity are produced.

While the invention is particularly adapted for use in a color television system embodying dot-sequential principles of scanning as disclosed in the above referred to copending application, and will be specifically described in connection with a dot-sequential scanning system, the invention is also applicable to color television systems embodying "line-sequential" scanning principles as later to be more fully pointed out.

The invention will be described in greater detail with reference to the appended drawings forming part of the specification and in which.

Figures 1A, 2, 3, 4:
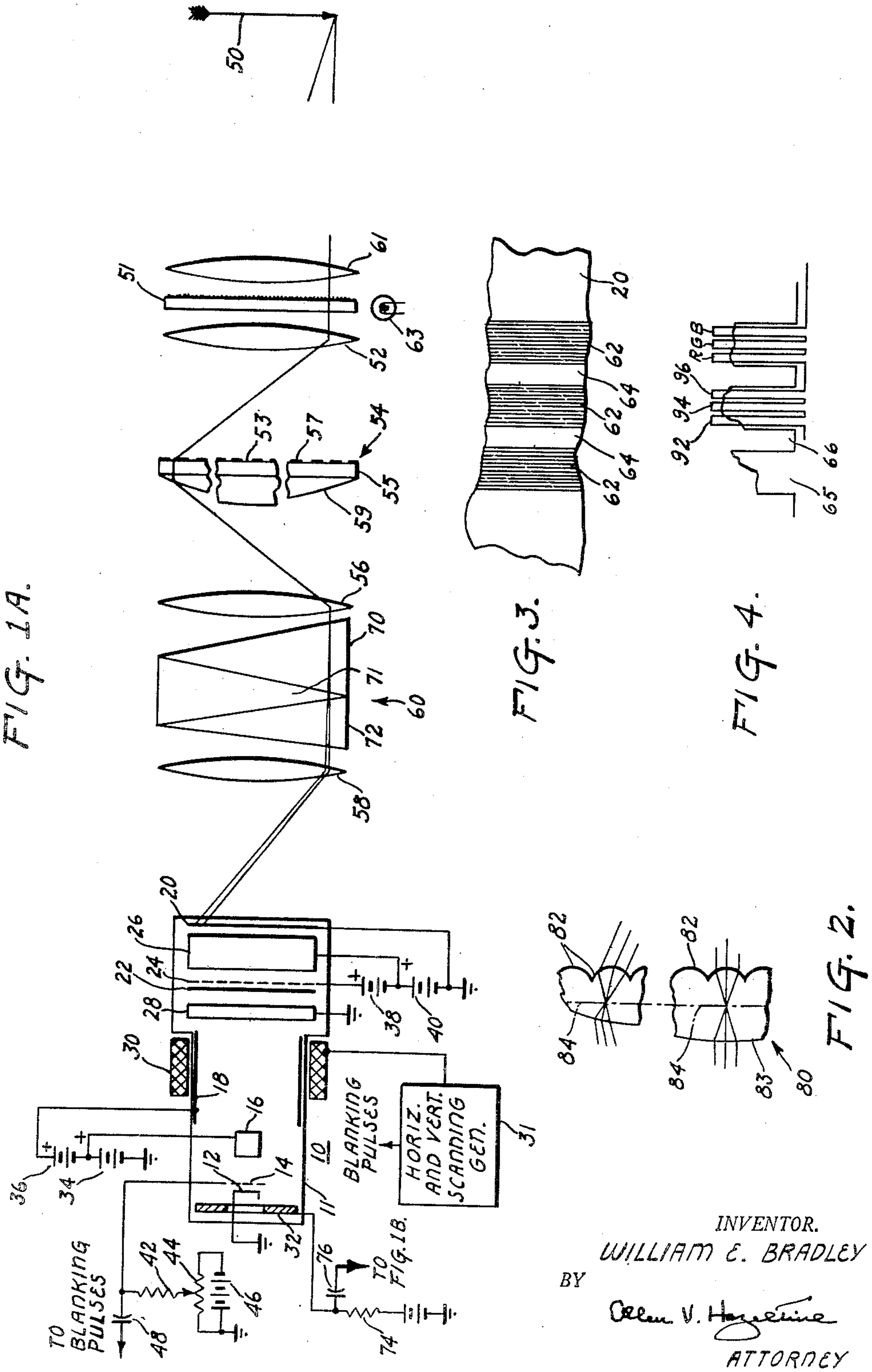
Figures 1A and 1B are diagrams partly schematic showing a camera system in accordance with the invention.
Figure 2 is a cross-sectional view of a portion of a collimating lien grating in accordance with a preferred embodiment of the invention.
Figure 3 is a diagram showing a portion of the photosensitive cathode of a camera tube and the distribution of the color spectra formed thereon.
Figure 4 is a graph showing the wave form of the signal voltage derived from the camera tube and the wave form of the sampling signal for resolving the signal voltage into its color components.
Figure 1B:
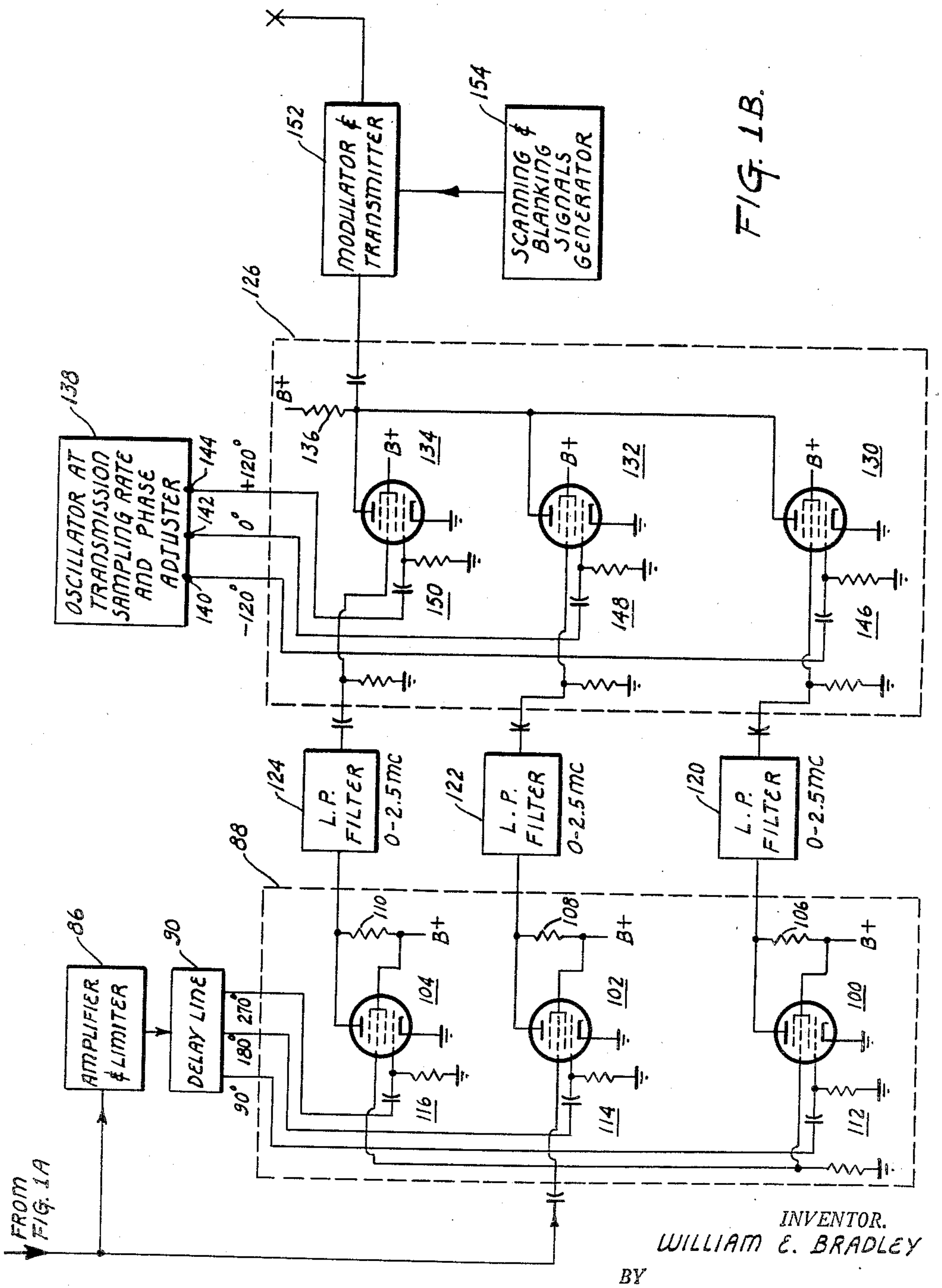

Referring to Figures 1A and 1B, the camera system there shown comprises a camera tube 10 having a high degree of resolution and which may be of the form known as an iconoscope, an image dissector tube, an image orthicon or the like. An image orthicon is illustrated, the construction of which is well known to those skilled in the art and accordingly no detailed description thereof is believed to be necessary in the present application. However, it will be noted that the tube indicated by the numeral 10, comprises, within a suitable evacuated envelope 11, an electron beam forming electrode system constituted by a cathode 12, a beam intensity control grid 14 and focusing and accelerating electrodes 16 and 18 respectively. At the end of the tube envelope remote from the cathode there are provided a photosensitive cathode 20 and a mosaic electrode 22. The photo-cathode 20, having preferably orthochromatic characteristics, operates to generate an electron image having a charge distribution corresponding to the light image which is focused thereon through the intermediary of a lens and color dispersion system later to be more fully described. The electron image on the photo-cathode 20 is transferred to the mosaic electrode 22 by means of accelerating screen and focusing electrodes 24 and 26 respectively, the screen electrode 24 serving to collect secondary electrons emitted by the mosaic electrode 22. A positive charge distribution is thereby formed on the surface of mosaic electrode 22, which charge migrates to the side of the mosaic 22 facing the cathode 12. The cathode ray beam suitably retarded by a decelerating electrode 28 is scanned across the surface of the mosaic electrode 22 by an appropriate deflection system such as the horizontal and vertical deflection coils 30 energized by scanning voltages generated by a horizontal and vertical scanning generator 31 and the returning beam is collected by an output electrode 32 which may include a secondary electron multiplier in conformance with standard practice. Operating potentials for the electrodes 16 and 18 are provided by the sources 34 and 36 respectively, connected in series, whereas the electrodes 24 and 26 are energized by the sources 38 and 40 as shown. Cathode 12, the photo-cathode 20 and the decelerating electrode 28 are maintained at ground potential. To vary the intensity of the beam the control grid 14 is given a variable bias potential through a resistor 42 connected to a tapping of a potentiometer 44 connected to a battery 46. Suitable blanking pulses derived, for example, from the generator 31 may be applied to the control grid 14 through a capacitor 48 to blank the electron beam during its return traces at the end of each scanning line.

The object to be televised is shown as 50 and, in accordance with the embodiment of the invention shown in Figures 1A and 1B, an optical image of this object is projected onto the surface of the photo-cathode 20 by means of a lens and color dispersion system which divides the image into a multiplicity of line elements and disperses each of the line elements into its color spectrum components. For this purpose there are provided a first lens system comprising convex lens elements 52 and 61, a collimating line grating 54, a second lens system made up of lens elements 56 and 58 and a prism system 60. The lens system 52–61 corresponds to the usual camera lens of a camera tube and its purpose is to form a real image of the object 50 in the plane of the line grating 54. The collimating line grating 54 consists of an opaque plane member having a multiplicity of parallel arranged equally spaced slits 53 arranged perpendicular to the direction of line scanning of the camera tube. More particularly, the grating 54 may consist of a transparent glass plate 55, one surface of which is provided with a thin opaque coating 57 which is ruled to provide the desired spaced slits shown as 53. A suitable method for forming the coating 57 is by a photographic process whereby an image of a line grating is focused on the surface of the glass plate 55 previously provided with a photographic emulsion and the photographic image so formed is subsequently developed. Alternately, the grating 54 may be formed by applying an opaque resinous or metallic coating on the glass plate 55 and thereafter ruling the coating in the manner well known to the art of forming diffraction gratings. For purposes of illustration, only the central and edge portions of the line grating have been shown and the scale of these portions has been enlarged. However, it will be understood that the number of slits 53 contained in the collimating line grating 54 corresponds to the number of picture elements contained in one line scan of the image and is determined by the desired degree of picture definition to be obtained from the camera tube up to a limiting value defined by the resolution of the camera and its associated optical system.

The object to be televised may have a fine periodic pattern, such as a textile weave pattern, which when imaged on the collimating line grating may make apparent to the camera course "beat patterns" which diminish the realism of the image. To avoid this effect it may be desirable to limit the resolution of the lens system for example by slightly defocusing the lens system 52–61 or by providing a small degree of diffusion by means of a lightly frosted or scratched transparent plate 51 so that no detail of the image formed in the plane of the grating 54 is smaller than one-half of the fundamental repetition period of the grating, i. e., no detail of the image is less than the distance between the slits 53. When the camera system is operated under conditions corresponding to the existing transmission standards of 60 fields per second, each field being made up of 525 scanning lines, and using a bandwidth of approximately 4 megacycles, the grating 54 may contain approximately 550 slits 53.

It is therefore seen that at the grating 54 there will be formed an image of the object 50, which image has been separated into a multiplicity of line elements each extending transverse to the scanning direction of the cathode ray beam. Subsequently each of these line elements is dispersed into a color spectrum and the color spectra so formed are projected onto the surface of the photo-cathode 20 by the prism system 60 and the lens system 56–58. The color dispersion brought about by the prism 60 forms on the photo-cathode 20 a multiplicity of color spectra each of which corresponds to one of the line elements and each of which has a color distribution corresponding to the color content of the corresponding line element in the image at the line grating 54.

In order to direct all of the light rays passing through the slits 53 towards the lens system 56—58, there may be provided a field lens 59 in the form of a convex lens element positioned on or integral with the glass plate 55. While the field lens is shown as a single lens element it may consist in practice of a multiple lens system having preferable achromatic characteristics.

A portion of the color spectra as it appears on the photo-cathode 20 is illustrated on an enlarged scale in Figure 3 wherein a portion of the photo-cathode 20 is shown with portions of the color spectra 62 of three adjacent line elements of the image at the grating 54 superimposed thereon. It will be noted that adjacent color spectra are spaced apart to form blank spaces 64. This effect is achieved by suitably correlating the amount of dispersion produced by the prism system 60 and the relative widths of the slits 53 and the opaque portions 57 of the collimating line grating 54. In practice the width of the slits is preferably less than one-fourth of the distance between the slits, and the degree of dispersion produced by the prism system 60 is so adjusted with respect to the remainder of the optical system that the blank or light-free space 64 (corresponding to a blank margin between each color spectrum) is conveniently about ⅓ or ¼ of the spacing between the beginning of two adjacent spectra.

The image formed as above described on the photo-cathode 20 is projected onto the mosaic 20 in the normal manner characterizing camera tubes of the type shown. By scanning the mosaic 22 with a cathode ray beam there is generated at the collector electrode 32 a voltage having amplitude variations corresponding to the intensity variations of the light projected on the photo-cathode. More particularly, and as shown in Figure 4, as the electron beam progresses across the surface of mosaic 22 it produces at the collector electrode 32 a voltage having, in consecutive order, amplitude values corresponding to the intensity of the red, green and blue color components of the spectrum of a given line element, followed by a value equivalent to zero illumination in view of the adjacent margin 64 (see Figure 3). The beam in turn scans the electron image corresponding to the adjacent spectra and the intervening margins so that, for each line scan, the voltage at the collector electrode comprises a plurality of consecutive spaced video pulses 65 with intervening index pulses 66. It will be appreciated that, since each of the line elements is resolved into a continuous spectrum, the amplitude variations of each pulse 65 occurs in a continuous manner as determined by the color content of the corresponding line element.

In some instances it may be desirable to accentuate the level of the pulse 66 relative to the level of pulse 65 so that, under no conditions of illumination of the object to be televised, will the pulse 65 have an amplitude not determinably different from the amplitude of the pulse 66. This may be affected by interposing, between the object to be televised and the collimating line grating 54, a source of diffused illumination whereby the image formed at the grating 54 has a luminosity greater than zero at all times. In the arrangement shown in Figure 1A this is accomplished by illuminating the diffusion plate 51 along one edge thereof by means of a lamp 63. The net effect of supplying this auxiliary illumination is that the blank spaces 64 (see Figure 3) correspond to a luminosity which is "blacker than black" and the corresponding impulse 66 generated by the camera tube has a blacker than black signal level.

In the arrangement specifically shown in Figure 1A the prism system 60 is positioned between the lens elements 56 and 58 for maximum convenience and to impinge thereon substantially parallel light rays. However, it is apparent that prism system 60 may be positioned anywhere in the optical path between the line grating 54 and the photo-cathode 20.

A prism system 60 of the usual type may produce non-linear spectra i. e. spectra in which the red, green and blue components are non-uniformly spaced, and thereby make it necessary to use the expedients later to be more fully discussed. However, it is preferable that the line elements be dispersed into linear spectra and, to achieve this result, the prism system 60 is constituted by multiple prism elements, the shape and index of refraction of which are so correlated that the non-linearity of dispersion is substantially cancelled and the usual compression at one end of the spectrum is expanded relative to the other end of the spectrum to produce a linear distribution. Furthermore, to simplify the arrangement of the optical system and the camera tube, the prism system 60 should exhibit a zero deviation. In the arrangement shown in Figure 1A these objectives are met by a composite prism system 60 made up of prism sections 70, 71 and 72. Suitable materials for the prism elements 70, 71 and 72 are well known. However, there may be mentioned quartz, flint glass and crown glass.

In the arrangement shown in Figure 1A a portion of the light from the object 50 impinges on and is absorbed by the opaque stripes 57 of the collimating line grating 54. In accordance with the preferred embodiment of the invention this normally absorbed light is made to contribute to the light available for analysis at the photo-cathode 20. More particularly, and as shown in Figure 2, the collimating line grating, shown in portion and on an enlarged scale and indicated by the numeral 80, is constituted by a multiplicity of cylindrical lenses 82, each of which refracts the light impinging thereon. The radius of curvature of the cylindrical surfaces of the lenses 82 is such that the light rays impinging on the cylindrical lenses are brought to a series of focus positions in an effective image plane contained within the body of the collimating line grating 80 and indicated at 84 so that there is formed a striped image similar to that formed by the arrangement shown in Figure 1A but having more intense brilliance. A field lens 83, preferably formed integral with the grating 80, is provided for the purpose above outlined in connection with the field lens 59 of Figure 1A.

The voltage derived from the collector electrode 32 and appearing across a load resistor 74 is applied through a capacitor 76 to an amplifier and limiter 86 and to a color signal sampling gate system 88 (see Figure 1B). The amplifier and limiter 86 conforms to conventional design and is characterized by sufficient gain to amplify the pulses 66 (see Figure 4) to a conveniently usable level, and may be adapted to do so without a distortion of the impulse wave form, although this is not essential so long as the phase characteristics of the amplifier are such that the positive peaks of the amplified output signals therefrom occur in predetermined time relationship to the occurrence of the impulses 66.

The output signals from amplifier 86 are supplied to the input of a delay line 90 which is provided with three taps. Delay line 90 may comprise a series of filter sections designed in accordance with principles well known in the art and is preferably terminated in its characteristic impedance to minimize reflections from the termination thereof.

The three tapping positions of the delay line are so chosen that three distinct groups of impulses are produced, the groups constituting impulse voltages having phase positions of 90°, 180° and 270° respectively relative to the effective position of the impulse 66. These impulse voltages, and their positions with respect to the impulse 66 and to the color signal impulse 65, are shown in Figure 4 and indicated by the numerals 92, 94 and 96 in the case of one group and by the letters R, G and B respectively in the case of the second group shown.

The color sginal sampling gate system 88 operates to sample the signal from collector electrode 32 so that the primary color components thereof are separated into individual channels. Such a gate system may comprise for example, three sampling tubes 100, 102 and 104. Sampling tube 100 may comprise a pentagrid vacuum tube which has its suppressor grid and its cathode grounded, its second and fourth grid connected to a suitable positive potential, its plate connected to the source of positive potential through a load resistor 106, its first grid connected to the 90° tapping of the delay line 90 and its third grid to the input signal derived from the collector electrode 32. Sampling tubes 102 and 104 may be substantially identical to sampling tube 100, having their third grids connected to the 180° and 270° tappings respectively, of the delay line 90 and having their plates connected to the positive potential source through load resistors 108 and 110 respectively. Each of the first grid circuits of the sampling tubes 100, 102 and 104 embody a resistance-capacitance circuit indicated by 112, 114 and 116, respectively.

The impulse voltage 92 derived from the 90° tapping of the delay line 90 constitutes a red signal sampling voltage, and its function is to make the sampling tube 100 conductive during the periods when the amplitude variations of the video signal impulse 65 (see Figure 4) are indicative of the red color component of the elemental color spectrum formed on the mosaic of the pick up tube. The time constant of the resistance capacitance network 112 is sufficiently long compared to the period of the impulse voltage 92 so that leveling upon the peaks of the impulse voltage is effected and actuation of the sampling tube 100 is made to occur only during a predetermined brief interval surrounding the time at which the impulse voltage attains its peak values. Similar considerations apply to the sampling tubes 102 and 104 and to the resistance capacitance networks 114 and 116 included in the first grid circuits of these tubes, whereby the impulse voltages 94 and 96 serve as green signal and blue signal sampling voltages for the tubes 102 and 104 respectively, making the same conductive when the amplitude variations of the color signal impulse 65 are indicative of the green and blue components of the elemental spectra. In Figure 4 the impulse voltages 92, 94 and 96 have been superimposed on two of the color signal impulses shown to indicate the relative times of occurrence of the respective impulses and to show the conduction periods of the respective sampling tubes.

As previously indicated, a prism system 60 (see Figure 1A) is used by which a linear dispersion of the color components is effected and in the preceding description such a dispersion has been assumed whereby the sampling pulses 92, 94 and 96 (see Figure 4) are of uniform time spacing. If a non-linear distribution of the color spectra is produced it is desirable to modify the relative positions of the impulses 92, 94 and 96 so that proper sampling of the primary color components is effected. This may be done for example, by deriving the impulses 92, 94 and 96 from tappings of the delay line 90 other than the 90°, 180° and 270° points selected for a uniformly distributed spectrum.

The output of the sampling tube 100 comprises a series of consecutive impulses indicative of the red color component of the consecutive spaced spectra formed on the photo-cathode 20. In the arrangement shown these pulses are integrated, for example by means of a low pass filter 120 or other suitable integrating circuit having a bandwidth slightly less than the frequency of occurrence of the impulses, to produce a continuously varying voltage having variations corersponding to variations of the red color content of the picture elements of the consecutive line scans of the pick-up tube. When using a sampling rate of approximately 2.67 megacycles per second the band pass filter may have a band width extending from 0 to 2.5 megacycles per second. By means of low pass filters 122 and 124 the green and blue signal impulses derived from the sampling tubes 102 and 104 respectively are converted into continuously varying voltages.

The red, green and blue signal voltages existing at the output of the filters 120, 122 and 124 are now sampled in time sequence by a color signal combining gate system 126 to produce an output signal in which the primary color components are multiplexed in a given sequence and at a given rate as established by the standards of the transmission system in which the camera system of the invention is to be used. This multiplexing sequence and sampling rate may be different from the sequence and sampling rate provided by the electron beam scanning of the camera tube so that optimum conditions in the camera tube may be used irrespective of the patricular transmission standards used.

In the form shown in Figure 1B, the combining gate system 126 comprises sampling tubes 130, 132 and 134 which sample the color signals from the low pass filters 120, 122 and 124 respectively, in sequence to produce a time-multiplex output signal. Sampler tube 130 may comprise a pentagrid vacuum tube having its suppressor and cathode grounded, its second and fourth grids connected to a suitable source of positive potential, its third grid supplied with the red video signal from the filter 120, its first grid supplied with a sampling signal for rendering the tube 130 conductive only during a predetermined portion of the sampling signal, and its plate connected to a source of positive potential through a plate load resistor 136. Sampling tubes 132 and 134 may be substantially identical with sampling tube 130, being supplied at their third grids with green and blue video signals from the filters 122 and 124 respectively, and having their respective plates connected to the source of positive potential through the common load resistor 136. The first grid of each of the tubes 132 and 134 is similarly supplied with a sampling signal for rendering the respective tubes conductive during periods in sequence with the conduction through the tube 130.

As a source of the sampling signals for the tubes 130, 132 and 134 there is provided an oscillator 138 operating at the sampling frequency and adapted, for example by suitable phase shifters coupled thereto, to provide three sampling voltages having a 120° phase shift relative to each other, such voltages being derived from the terminals 140, 142 and 144.

The voltage at tap 140 constitutes a red-signal sampling signal which is supplied through a resistance capacitance circuit 146 to the first grid of red sampler tube 130 so as to produce actuation thereof and thereby effect application of a sample of the red video input signal to the output of the gate system 126. The time constant of resistance capacitance network 146 is sufficiently long, compared to the period of the sampling signals supplied thereto from terminal 140 so that leveling upon the peaks of the sampling signals supplied thereto is effected, and actuation of sampling tube 130 is caused to occur only during a predetermined brief interval surrounding the time at which the sampling signal attains its peak output.

Similarly, the sampling signal at terminal 142 of the oscillator 138 is supplied through resistance-capacitance network 148 to the first grid of sampling tube 132 so as to effect sampling of the green video signal when the sampling signal attains its maximum value. Finally, the voltage at the terminal 144 is supplied through resistance-capacitance network 150 to the first control grid of blue sampler tube 134 so as to effect actuation thereof when the peak value of the voltage is attained.

The sampling system above outlined produces sampling of the color components of each consecutive picture element contained in a line scan. In the event that dot-interlacing principles are to be applied to the sampling system, the oscillator 138 may contain suitable keying circuits by means of which, during each line scan, successive groups of red, green and blue sampling pulses are spaced apart by a time period corresponding to the duration of the group and by means of which similarly spaced groups, having a phase position interleaving the first group, are produced during a second scanning of the given line scan. A suitable dot-interlacing system for this purpose is described in the above referred to copending application of W. P. Boothroyd and E. M. Creamer, Jr.

The output of the gate system 126 is coupled to a modulator and transmitting system 152 of conventional design and containing the usual radio frequency energy means, a video signal amplifier and modulators for the video signal and the scanning and blanking pulses, the latter pulses being derived from a conventional scanning and blanking pulse generator 154.

It is apparent from the foregoing description that the camera system of the invention is also applicable to the so-called "line-sequential" system of scanning. For example, to adapt the camera system shown in Figure 1A for line-sequential scanning it is merely necessary to rotate the collimating line grating 54 and the dispersion prism 60 through an angle of 90° so that the image to be transmitted is separated into line elements contained in parallel horizontal planes and the color spectra formed on the photo-cathode 20 are similarly arranged in horizontal bands. The color spectra so formed are analyzed by successive horizontal scans of the mosaic 22 so that, for each scan, there will be produced an output signal indicative of one of the primary color components of each of the line elements and succeeding line scans appropriately spaced from the path of the first line scan will produce successive output signals indicative of the remaining primary color components of each line element.

While I have described my invention by means of specific examples and in specific embodiments, I do not wish to be limited thereto, for obvious modifications will occur to those skilled in the art without departing from the spirit and scope of the invention.

What I claim is:

1. A camera system for producing a signal voltage indicative of the magnitudes of the color components of the color content of an object, comprising a camera tube having a photosensitive element adapted to produce an electric charge image having a charge distribution and intensity proportional to the distribution and intensity of light falling on said element, means to form an optical image of said object in a given image plane, means to resolve said optical image into a multiplicity of adjacently arranged image line elements, means to disperse said line elements into a plurality of adjacently positioned color spectra each of the constituent color components of a respective line element and to project the said color spectra onto said photosensitive element thereby to form on said photosensitive element an electron image comprising a multiplicity of adjacently arranged electron image bands, and means to scan said electric charge image to produce a signal voltage having variations proportional to the variations in the intensities of the color components of said spectra.

2. A camera system for producing a signal voltage indicative of the magnitudes of the color components of the color content of an object, comprising a camera tube having a photosensitive electrode element adapted to produce an electron image having a charge distribution and intensity proportional to the distribution and intensity of light falling on said photosensitive element, means to form an optical image of said object in a given image plane, means to resolve said optical image into a multiplicity of substantially parallel image line elements, means to disperse said line elements into a plurality of adjacently positioned substantially parallel optical image bands each having transverse variations constituting a color spectrum of the constituent color components of the respective line elements and to project the said image bands onto said photosensitive element to thereby form a multiplicity of adjacently arranged electron image bands, and means to transversely scan said electron image bands to produce a signal voltage having variations proportional to the variations in the intensities of the color components of said optical image bands.

3. A camera system for producing a signal voltage indicative of the magnitudes of the color components of the color content of an object, comprising a camera tube having a photosensitive cathode element adapted to proluce an electron image having a charge distribution and intensity proportional to the distribution and intensity of light falling on said cathode element, means to form an optical image of said object in a given image plane, a collimating line grating comprising a plate member arranged in the vicinity of said image plane and provided with spaced parallel-arranged opaque portions to resolve said optical image into a multiplicity of adjacently arranged image line elements, means to disperse said line elements into a plurality of adjacently positioned color spectra each of the constituent color components of a respective line element and to project the said color spectra onto said photosensitive cathode element thereby to form on said cathode element an electron image comprising a multiplicity of adjacently arranged electron image bands, and means to scan said electron image to produce a signal voltage having variations proportional to the variations in the intensities of the color components of said spectra.

4. A camera system for producing a signal voltage indicative of the magnitudes of the color components of the color content of an object, comprising a camera tube having a photosensitive cathode element adapted to proluce an electron image having a charge distribution and intensity proportional to the distribution and intensity of light falling thereon, means to form an optical image of said object in a given image plane, a collimating line grating comprising a multiplicity of contiguous cylindrical lens elements arranged in the vicinity of said image plane to resolve said optical image into a multiplicity of adjacently arranged image line elements, means to disperse said line elements into a plurality of adjacently positioned color spectra each of the constituent color components of a respective line element and to project the said color spectra onto said photosensitive cathode element thereby to form on said cathode element an electron image comprising a multiplicity of adjacently arranged electron image bands, and means to scan said electron image to produce a signal voltage having variations proportional to the variations in the intensities of the color components of said spectra.

5. A camera system for producing a signal voltage indicative of the magnitudes of the color components of the color content of an object, comprising a camera tube having a photosensitive cathode element adapted to produce an electron image having a charge distribution and intensity proportional to the distribution and intensity of light falling on said cathode element, means to form an optical image of said object in a given image plane, means to resolve said optical image into a multiplicity of adjacently arranged image line elements, a prism member for dispersing said line elements into a plurality of adjacently positioned color spectra each of the constituent color components of a respective line element, means to project the said color spectra onto said photosensitive cathode element thereby to form on said cathode element an electron image comprising a multiplicity of adjacently arranged electron image bands, and means to scan said electron image to produce a signal voltage having variations proportional to the variations in the intensities of the color components of said spectra.

6. A camera system for producing a signal voltage indicative of the magnitudes of the color components of the color content of an object, comprising a camera tube having a photosensitive cathode element adapted to produce an electron image having a charge distribution and intensity proportional to the distribution and intensity of light falling on said cathode element, means to form an optical image of said object in a given image plane, means to resolve said optical image into a multiplicity of adjacently arranged image line elements, a prism member for dispersing said line elements into a plurality of adjacently positioned color spectra each of the constituent color components of a respective line element, said prism member comprising first and second prism elements arranged together to produce substantially zero deviation of the said color spectra, means to project the said color spectra onto said photosensitive cathode element thereby to form on said cathode element an electron image comprising a multiplicity of adjacently arranged electron image bands, and means to scan said electron image to produce a signal voltage having variations proportional to the variations in the intensities of the color components of said spectra.

7. A camera system for producing a signal voltage indicative of the magnitudes of the color components of the color content of an object, comprising a camera tube having a photosensitive cathode element adapted to produce an electron image having a charge distribution and intensity proportional to the distribution and intensity of light falling on said cathode element, means to form an optical image of said object in a given image plane, means to resolve said optical image into a multiplicity of substantially parallel image line elements, means to disperse said line elements into substantially parallel optical image bands spaced apart and each having transverse variations constituting a color spectrum of the constituent color components of the respective line elements and to project the said image bands onto said photosensitive cathode element to thereby form a multiplicity of electron image bands spaced apart, and means to transversely scan said electron image bands to produce a signal voltage comprising a first group of spaced pulses having amplitude variations proportional to the variations in the intensities of the color components of said optical image bands and a second group of spaced pulses alternately positioned with respect to said first group of pulses and having a given amplitude value.

8. A camera system for producing a signal voltage indicative of the magnitudes of the color components of the color content of an object, comprising a camera tube having a source of an electron beam and a photosensitive cathode element adapted to produce an electron image having a charge distribution and intensity proportional to the distribution and intensity of light falling on said cathode element, means to form an optical image of said object in a given image plane, means to resolve said optical image into a multiplicity of substantially parallel image line elements, means to disperse said line elements into substantially parallel optical image bands each having transverse variations constituting a substantially linearly varying color spectrum of the constituent color components of the respective line elements, said dispersion means comprising a first dispersion system having a first non-linear dispersion characteristic and a second dispersion system having a second non-linear dispersion characteristic and positioned relative to said first dispersion system to produce a resulting dispersion of substantially linear characteristic, means to project the said image bands onto said photosensitive cathode element to thereby form a multiplicity of electron image bands, and means to deflect said beam to transversely scan said electron image bands therewith to produce a signal voltage having variations proportional to the variations in the intensities of the color components of said optical bands.

9. A camera system for producing a signal voltage indicative of the magnitudes of the color components of the color content of an object, comprising a camera tube having a source of an electron beam and a photosensitive cathode element adapted to produce an electron image having a charge distribution and intensity proportional to the distribution and intensity of light falling on said cathode element, a lens system for forming an optical image of said object in a given image plane, a collimating line grating member arranged in the vicinity of said image plane for resolving said optical image into a multiplicity of substantially parallel image line elements, a field lens element positioned between said line grating member and said cathode element, a prism member interposed between said field lens element and said cathode element for dispersing said line elements into substantially parallel optical bands each having transverse variations constituting a color spectrum of the constituent color components of the respective line elements, means to project the said image bands onto said photosensitive cathode element to thereby form a multiplicity of electron image bands, and means to deflect said beam to transversely scan said electron image bands therewith to produce a signal voltage having variations proportional to the variations in the intensities of the color components of said optical image bands.

10. A camera system for producing a signal voltage indicative of the magnitudes of the color components of the color content of an object, comprising a camera tube having a source of an electron beam and a photosensitive cathode element adapted to produce an electron image having a charge distribution and intensity proportional to the distribution and intensity of light falling on said cathode element, a lens system for forming an optical image of said object in a given image plane, a collimating line grating member arranged in the vicinity of said image plane for resolving said optical image into a multiplicity of substantially parallel image line elements, a light diffusing member arranged between said object and said grating member, a field lens element positioned between said line grating member and said cathode element, means to disperse said line elements into substantially parallel optical image bands each having transverse variations constituting a color spectrum of the constituent color components of the respective line elements and to project the said image bands onto said photosensitive cathode element to thereby form a multiplicity of electron image bands, said latter means comprising first and second lens elements interposed between said field lens element and said cathode element and a prism member interposed between said first and second lens elements, and means to deflect said beam to transversely scan said electron image bands therewith to produce a signal voltage having variations proportional to the variations in the intensities of the color components of said optical image bands.

11. A camera system for producing signal voltages each proportional to a given primary color component of the color content of an object, comprising a camera tube having a source of an electron beam and a photosensitive cathode element adapted to produce an electron image having a charge distribution and intensity proportional to the distribution and intensity of light falling on said cathode element, means to form an optical image of said object in a given image plane, means to resolve said optical image into a multiplicity of substantially parallel image line elements, means to disperse said line elements into substantially parallel optical image bands spaced apart and each having transverse variations constituting a color spectrum of the constituent color components of the respective line elements and to project the said image bands onto said photosensitive cathode element to thereby form a multiplicity of electron image bands spaced apart, means to deflect said beam to transversely scan said electron image bands therewith to produce a signal voltage comprising a first group of spaced pulses having amplitude values proportional to the intensities of the color components of said optical image bands and a second group of spaced pulses alternately positioned with respect to said first group of pulses and having a given amplitude value, and means responsive to pulses of said second group to analyze said pulses of said first group at given intervals spaced apart by time intervals proportional to the spacings of the primary color components of said spectra.

12. A camera system for producing a signal voltage indicative of the magnitudes of the color components of the color content of an object, comprising a camera tube having a source of an electron beam and a photosensitive cathode element adapted to produce an electron image having a charge distribution and intensity proportional to the distribution and intensity of light falling on said cathode element, means to form an optical image of said object in a given image plane, a collimating line grating arranged in the vicinity of said image plane for resolving said optical image into a multiplicity of substantially parallel image line elements, a source of diffused light interposed between said object and said line grating to add a given luminosity to the luminosity of said line elements, means to disperse said line elements into substantially parallel optical image bands spaced apart and each having transverse variations constituting a color spectrum of the constituent color components of the respective line elements and to project the said image bands onto said photosensitive cathode element to thereby form a multiplicity of electron image bands spaced apart, and means to deflect said beam to transversely scan said electron image bands therewith to produce a signal voltage comprising a first group of spaced pulses having amplitude values above a given value proportional to said given luminosity and proportional to the intensities of the color components of said optical image bands, and a second group of spaced pulses alternately positioned with respect to said first group of pulses and having an amplitude value less than said given value.

13. A camera system for producing signal voltages each proportional to a given primary color component of the color content of an object, comprising a camera tube having a source of an electron beam and a photosensitive cathode element adapted to produce an electron image having a charge distribution and intensity proportional to the distribution and intensity of light falling on said cathode element, means to form an optical image of said object in a given image plane, a collimating line grating arranged in the vicinity of said image plane for resolving said optical image into a multiplicity of substantially parallel image line elements, means to disperse said line elements into substantially parallel optical image bands spaced apart and each having transverse variations constituting a substantially linearly varying color spectrum of the constituent color components of the respective line elements, means to project the said image bands onto said photosensitive cathode element to thereby form a multiplicity of electron image bands spaced apart, means to deflect said beam to transversely scan said electron image bands therewith to produce a signal voltage comprising a first group of spaced pulses having amplitude values proportional to the intensities of the color components of said optical image bands and a second group of spaced pulses alternately positioned with respect to said first group of pulses and having a given amplitude value, and means responsive to pulses of said second group to analyze said pulses of said first group at given intervals of substantially uniform spacing to produce output voltages each proportional to a primary color component of the said color spectra.

14. A camera system for producing signal voltages each proportional to a given primary color component of the color content of an object, comprising a camera tube having a source of an electron beam and a photosensitive cathode element adapted to produce an electron image having a charge distribution and intensity proportional to the distribution and intensity of light falling on said cathode element, means to form an optical image of said object in a given image plane, a collimating line grating comprising a plate member arranged in the vicinity of said image plane and provided with spaced parallel arranged opaque portions for resolving said optical image into a multiplicity of substantially parallel image line elements, means to disperse said line elements into substantially parallel optical image bands spaced apart and each having transverse variations constituting a substantially linearly varying color spectrum of the constituent color components of the respective line elements, means to project the said image bands onto said photosensitive cathode element to thereby form a multiplicity of electron image bands spaced apart, means to deflect said beam to transversely scan said electron image bands therewith to produce a signal voltage comprising a first group of spaced pulses having amplitude values proportional to the intensities of the color components of said optical image bands and a second group of spaced pulses alternately positioned with respect to said first group of pulses and having a given amplitude value, and means responsive to pulses of said second group to analyze said pulses of said first group at given intervals of substantially uniform spacing to produce output voltages each proportional to a primary color component of the said color spectra.

15. A camera system for producing signal voltages each proportional to a given primary color component of the color content of an object, comprising a camera tube having a source of an electron beam and a photosensitive cathode element adapted to produce an electron image having a charge distribution and intensity proportional to the distribution and intensity of light falling on said cathode element, means to form an optical image of said object in a given image plane, a collimating line grating comprising a multiplicity of contiguous cylindrical lens elements arranged in the vicinity of said image plane for resolving said optical image into a multiplicity of substantially parallel image line elements, means to disperse said line elements into substantially parallel optical image bands spaced apart and each having transverse variations constituting a substantially linearly varying color spectrum of the constituent color components of the respective line elements, means to project the said image bands onto said photosensitive cathode element to thereby form a multiplicity of electron image bands spaced apart, means to deflect said beam to transversely scan said electron image bands therewith to produce a signal voltage comprising a first group of spaced pulses having amplitude values proportional to the intensities of the color components of said optical image bands and a second group of spaced pulses alternately positioned with respect to said first group of pulses and having a given amplitude value, and means responsive to pulses of said second group to analyze said pulses of said first group at given intervals of substantially uniform spacing to produce output voltages each proportional to a primary color component of the said color spectra.

References Cited in the file of this patent

UNITED STATES PATENTS

| Number | Name | Date |
|---|---|---|
| 2,479,820 | De Vore | Aug. 23, 1943 |
| 2,567,240 | Sites | Sept. 11, 1951 |
| 2,579,971 | Schade | Dec. 25, 1951 |

FOREIGN PATENTS

| Number | Country | Date |
|---|---|---|
| 530,777 | Great Britain | Dec. 20, 1940 |
| 924,823 | France | Aug. 18, 1947 |

OTHER REFERENCES

Serial No. 251,004, Valensi (A. P. C.), published July 13, 1943.